US008226147B2

(12) United States Patent
Bruck et al.

(10) Patent No.: US 8,226,147 B2
(45) Date of Patent: Jul. 24, 2012

(54) LINEAR LATCH WITH SPRING BIASED AND OPPOSITE TEETHED GEAR RACK FOR USE WITH AN UPPER REAR PIVOTING SEAT BACK

(75) Inventors: Stephen C. Bruck, Howell, MI (US); Harry Keith Brantley, Auburn Hills, MI (US)

(73) Assignee: BAE Industries, Inc., Warren, MI (US)

( * ) Notice: Subject to any disclaimer, the term of this patent is extended or adjusted under 35 U.S.C. 154(b) by 273 days.

(21) Appl. No.: 12/691,347

(22) Filed: Jan. 21, 2010

(65) Prior Publication Data

US 2011/0175418 A1 Jul. 21, 2011

(51) Int. Cl.
*B60N 2/22* (2006.01)
*B60N 2/235* (2006.01)

(52) U.S. Cl. .................................. 296/65.16; 296/65.17

(58) Field of Classification Search ............... 296/65.09, 296/65.16, 65.17; 297/362.12, 362.14
See application file for complete search history.

(56) References Cited

U.S. PATENT DOCUMENTS 2,066,901 A 1/1937 Preble
4,243,264 A 1/1981 Bell
4,245,866 A 1/1981 Bell et al.
4,279,442 A 7/1981 Bell
4,577,730 A 3/1986 Porter
4,579,386 A 4/1986 Rupp et al.
4,898,424 A 2/1990 Bell
5,219,045 A 6/1993 Porter et al.
5,421,640 A 6/1995 Bauer et al.
5,498,052 A * 3/1996 Severini et al. ............ 296/65.09
5,568,843 A 10/1996 Porter et al.
5,618,083 A 4/1997 Martone et al.
5,741,046 A * 4/1998 Leuchtmann et al. ... 297/378.13
5,794,470 A 8/1998 Stringer
5,819,881 A 10/1998 Stringer
5,947,560 A * 9/1999 Chen ........................ 297/362.12
5,957,522 A * 9/1999 Matsuhashi et al. ............ 296/66
5,979,986 A 11/1999 Pejathaya
5,984,412 A 11/1999 Magyar
6,017,090 A 1/2000 Bonk
6,073,986 A * 6/2000 Neale et al. ..................... 296/63
6,155,644 A 12/2000 Rogala
6,161,657 A 12/2000 Zhuang et al.
6,279,994 B1 * 8/2001 Gehart ..................... 297/362.12
6,491,344 B1 12/2002 Stumpf et al.
6,547,332 B2 4/2003 Pejathaya
6,557,941 B1 5/2003 Heckel, Jr. et al.
6,568,758 B1 5/2003 Berg et al.

(Continued)

*Primary Examiner* — Glenn Dayoan
*Assistant Examiner* — Gregory Blankenship
(74) *Attorney, Agent, or Firm* — Gifford, Krass, Sprinkle, Anderson & Citkowski, P.C.

(57) ABSTRACT

A linear latch interconnecting a pivoting seatback with a frame location of a vehicle interior. The latch includes a bracket secured to a surface of the frame. An elongated gear rack exhibits upper and lower ratchet defining surfaces and is supported in linearly displaceable fashion to the bracket, a forward extending end of the gear rack connecting to the seatback such that the gear rack is biased in a first lineal direction relative to the bracket. A pair of locking members are pivotally secured to the bracket and are biased in first directions to engage selected teeth associated with the upper and lower ratchet defining surfaces of the gear rack. The locking members are concurrently pivoted out of contact with the gear rack to permit readjustment of the seatback in a second counter-biasing direction, following which they re-engage additional selected teeth associated with gear rack surfaces.

20 Claims, 4 Drawing Sheets

U.S. PATENT DOCUMENTS 6,655,741 B2 12/2003 Bonk
6,761,408 B2 7/2004 Lim et al.
6,948,772 B1 9/2005 Robinson et al.
6,971,720 B2 12/2005 Bonk
7,156,442 B2 * 1/2007 McManus et al. ......... 296/65.09
7,311,360 B2 12/2007 Waligora et al.
7,753,428 B2 * 7/2010 Kato et al. ................ 296/65.09
7,954,873 B2 * 6/2011 Abe et al. .................. 296/65.05
2010/0038948 A1 * 2/2010 Pigeon .......................... 297/362
2010/0133870 A1 * 6/2010 Kan et al. .................. 296/65.18
2010/0148558 A1 * 6/2010 Bruck et al. ............ 297/362.14
2011/0241402 A1 * 10/2011 Bruck et al. ............ 297/362.14

* cited by examiner

LINEAR LATCH WITH SPRING BIASED AND OPPOSITE TEETHED GEAR RACK FOR USE WITH AN UPPER REAR PIVOTING SEAT BACK

FIELD OF THE INVENTION

The present invention relates generally to a linear latch for use with an upper pivoting seatback. More specifically, the present invention discloses a linear latch including a rear bracket secured to a forward facing package shelf surface associated with a sedan-type vehicle. A linearly extending and spring biased gear rack is secured in both pivotal and axially displaceable fashion relative the rear bracket, the gear rack further exhibiting an interior slot which receives a laterally extending pin for defining a range of axial displacement of the gear rack. Opposite linear surfaces of the gear rack exhibit alternate facing teeth patterns, these respectively seating upper and lower pivotally biased and cable disengaged locks for adjustably engaging the gear rack at selected locations and in order to define a range of seatback motion between upright design and rear recline positions.

BACKGROUND OF THE INVENTION

The prior art is well documented with examples of linear latch designs, such as for use in a vehicle seat recliner. Notable examples include a latch mechanism for a vehicle seat disclosed in Bell, U.S. Pat. No. 4,245,866 which controls the pivotal movement of a seat back relative to a seat bottom. A pair of latches are engageable with an articulated slidable link to latch the seat at a desired reclining position. The latches are manually movable to an unlatched condition to allow relative movement therebetween by the link.

U.S. Pat. No. 4,279,442, also to Bell, teaches a mechanism for controlling reclining movement of a vehicle seat back winch includes a pair of pawls engageable with an articulated and slidable ratchet arm for latching the seat at a desired reclining position. The pawls are then manually movable to an unlatched condition relative to the ratchet arm via a pair of pawl control plates for permitting movement of the ratchet arm. Bell, U.S. Pat. No. 4,243,264, discloses a related latch mechanism and having a pair of spring loaded latches engageable with an articulated sliding link.

Other references of note include the linear mechanical lock with one-piece lock housing of Porter, U.S. Pat. No. 5,219,045. Of note, a rod is normally gripped against axial translation through a housing by a coil spring and released by unwinding the spring. The one piece housing integrally contains the spring and related rod bearing elements.

SUMMARY OF THE INVENTION

The present invention discloses a linear latch for use with an upper pivoting seatback and which interconnects a pivoting seatback with a frame location of a vehicle interior. The latch includes a bracket secured to a surface of the frame. An elongated gear rack exhibits upper and lower ratchet defining surfaces and is supported in linearly displaceable fashion to the bracket, a forward extending end of the gear rack connecting to the seatback such that the gear rack is biased in a first lineal direction relative to the bracket.

A pair of locking members are pivotally secured to the bracket and are biased in first directions to engage selected teeth associated with the upper and lower ratchet defining surfaces of the gear rack. The locking members are concurrently pivoted out of contact with the gear rack to permit readjustment of the seatback in a second counter-biasing direction, following which they re-engage additional selected teeth associated with gear rack surfaces.

Additional features include a housing associated with the bracket having a forward facing and centrally disposed face and a pair of side extending faces. An aperture is defined in the forward face of the housing, permitting the gear rack to displace therethrough and further including the gear rack extending through an aligning recess in the frame upon the seat back being reclined rearwardly. A pair of angled tabs are provided and pivotally support the housing at first ends and fixedly mounting to the frame at second angled ends. A pin extends through apertures defined in the first ends of the tabs and aligning apertures defined in the side faces of the housing.

Each of the locking members further include a tooth engaging portion from which extends at least one leg within which is defined a coaxial support a spaced distance from the engaging portion through which is seated the pin. More specifically, each of the locking members exhibits a pair of coaxial supports associated with a first selected locking member arranged in overlapping fashion relative to a pair of coaxial supports associated with a second selected locking member.

A tab extends from at least one leg of a first locking member and which, upon actuating a further trigger portion associated with a first locking member, causes the tab to engage a leg associated with the second locking member, with the result that both of the locking members to pivot out of contact with said gear rack. A pair of torsion springs are each supported upon an opposing inner surface of the bracket housing via a spacer bushing positionally supporting a looped portion of each torsion spring in alignment with the coaxial supports. The torsion springs are secured to the side extending faces of the housing to influence the locking members in first biased directions. A hollow spacer collar is supported between an inner most pair of coaxial supports.

Other features include the provision of an elongated slot extending along a lineal interior of the gear rack and through which the crosswise extending and pivot defining bracket pin seats. A cable includes an outer stationary portion secured to a location associated with the housing, an inner translating portion extending from the outer portion and engaging the trigger.

The gear rack is biased in a direction away from the bracket via a coil spring supported around the gear rack in extending fashion between a cylindrical shaped shield secured over the forward face of the housing at a first end and a linearly displaceable return stop biased against the forward extending end. Also, a plurality of teeth associated with a first ratchet defining surface faces in a direction opposite a further plurality of teeth associated with the second ratchet defining surface.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
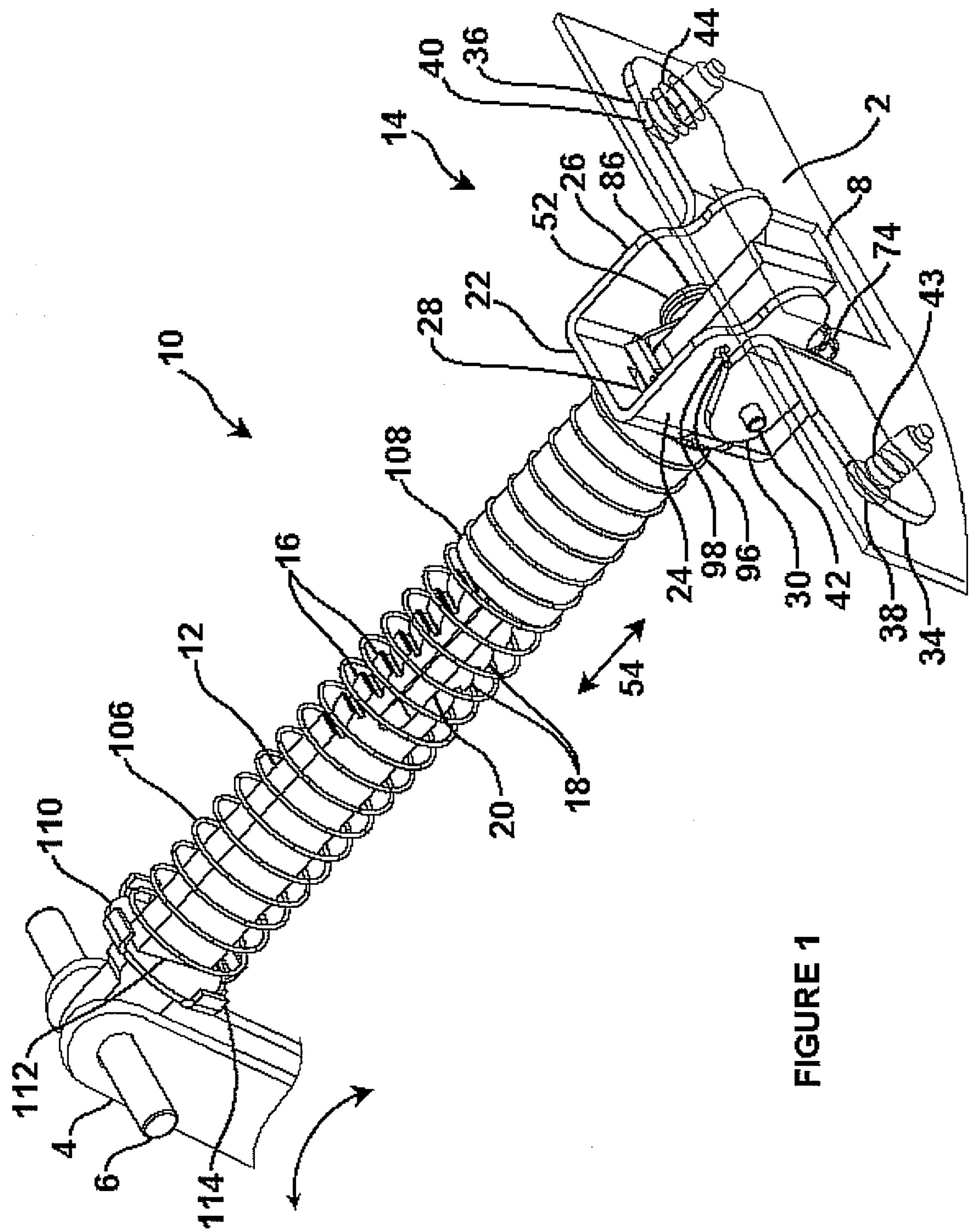
FIG. 1 is an assembled perspective of the linear latch.

Referring now to FIGS. 1-4, the present invention relates generally to a linear latch, generally shown at 10 in FIG. 1 for use with an upper pivoting seatback. The latch 10 most broadly includes an elongated gear rack 12 and a pivotal supporting bracket and housing subassembly, at 14, and is supported between an upper bracket mounting location, see as representatively shown at 2, associated with an inner and forward facing package shelf surface associated with the vehicle and a support location, further at 4, associated with the seatback which is above the pivot axis (not shown) of the seat back. A laterally extending mounting pin 6 is shown in extending fashion from an end of the elongated gear rack 12 and is further understood to provide pivotal mounting support between the gear rack 12 and the mounting location to the seat back support 4.

Figure 2:
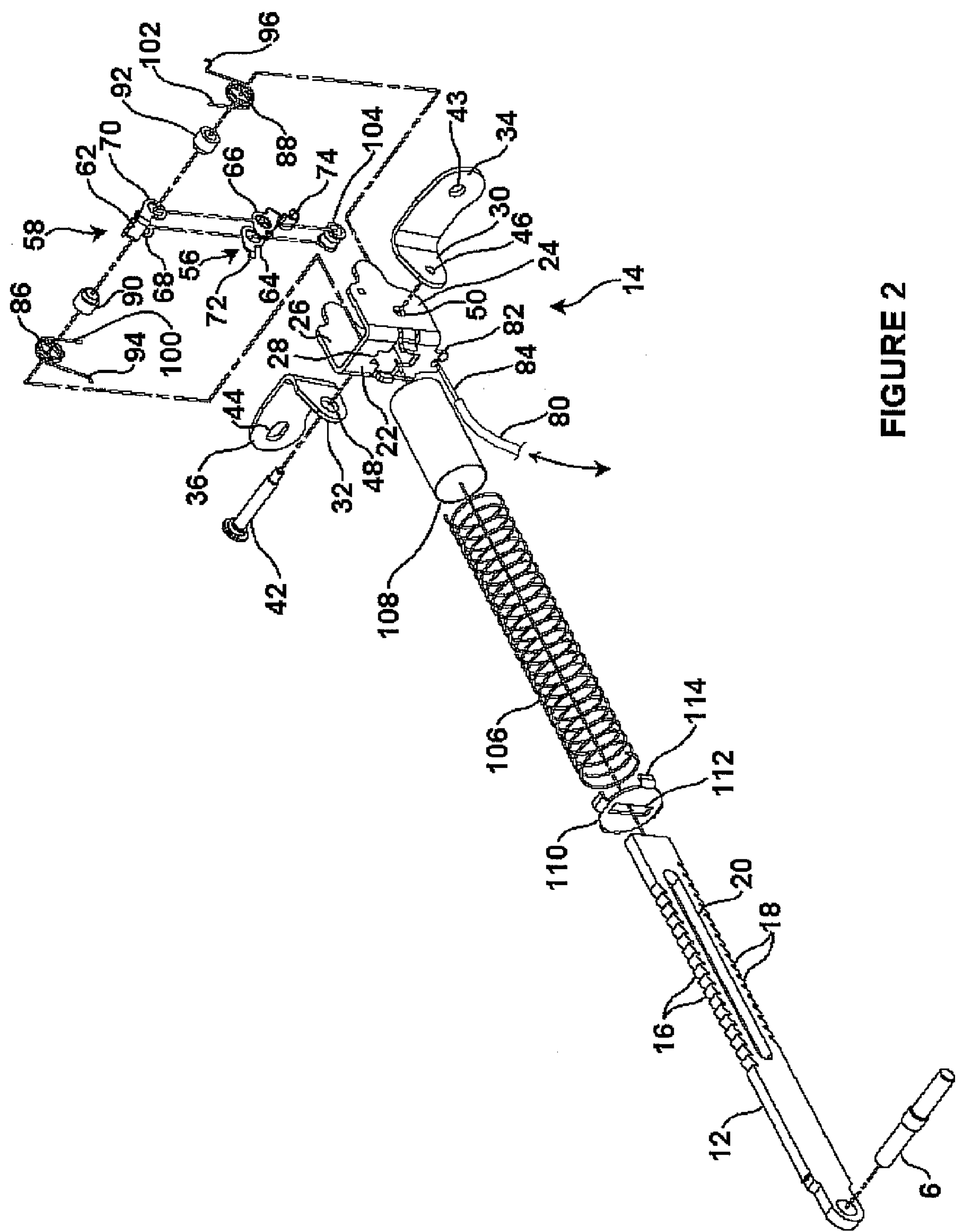
FIG. 2 is an exploded view of the latch shown in FIG. 1.

Referring again to FIG. 1, as well as to the exploded view of FIG. 2, the gear rack 12 exhibits a generally elongated and flattened planar configuration such as constructed of steel or other like durable material and with upper 16 and lower 18 pluralities of teeth respectively defining upper and lower ratchet defining surfaces. As shown and as will be further described in detail, the upper 16 plurality of ratchet defining teeth extend in a first (rearwardly) facing direction, whereas the lower 18 plurality are arranged in an opposite (forwardly facing direction). The gear rack 12 also includes an elongated slot (see inner perimeter defined wall 20) extending a specified distance along a lineal interior of the gear rack.

The bracket and housing subassembly 14, also constructed of a steel or suitable durable material, further includes a housing associated with the bracket having a forward facing and centrally disposed face 22 and a pair of side extending faces 24 and 26. An aperture (see inner perimeter wall 28) is defined in the forward disposed face 22 of the three dimensional defined housing, this permitting the gear rack 12 to displace therethrough, and which further envisions the gear rack also extending through an aligning recess in the frame 2 (see outline shown at 8 in FIG. 1), this upon the seat back 4 being reclined rearwardly. The bracket further includes pair of angled tabs pivotally supporting the housing at first ends 30 and 32 and fixedly mounting to the frame at second angled ends 34 and 36, such as further via engaging bolts 38 and 40 (FIG. 1) which extend through apertures 43 and 44 in the second ends 34 and 36.

A pivot pin 42 extends through apertures 46 and 48 defined in the first angled ends 30 and 32 of the tabs and additional aligning apertures 50 (FIG. 2) and 52 (FIG. 1) defined in the side faces 24 and 26 of the housing, this in order to permit the three dimensional housing to pivot relative to the angled tabs. The pivot pin 42 further seats through the lineal extending and elongated slot 20, thereby defining a bidirectional range of displacement, see arrow 54 in FIG. 1, of the gear rack 12 relative to the bracket housing.

Figure 3:
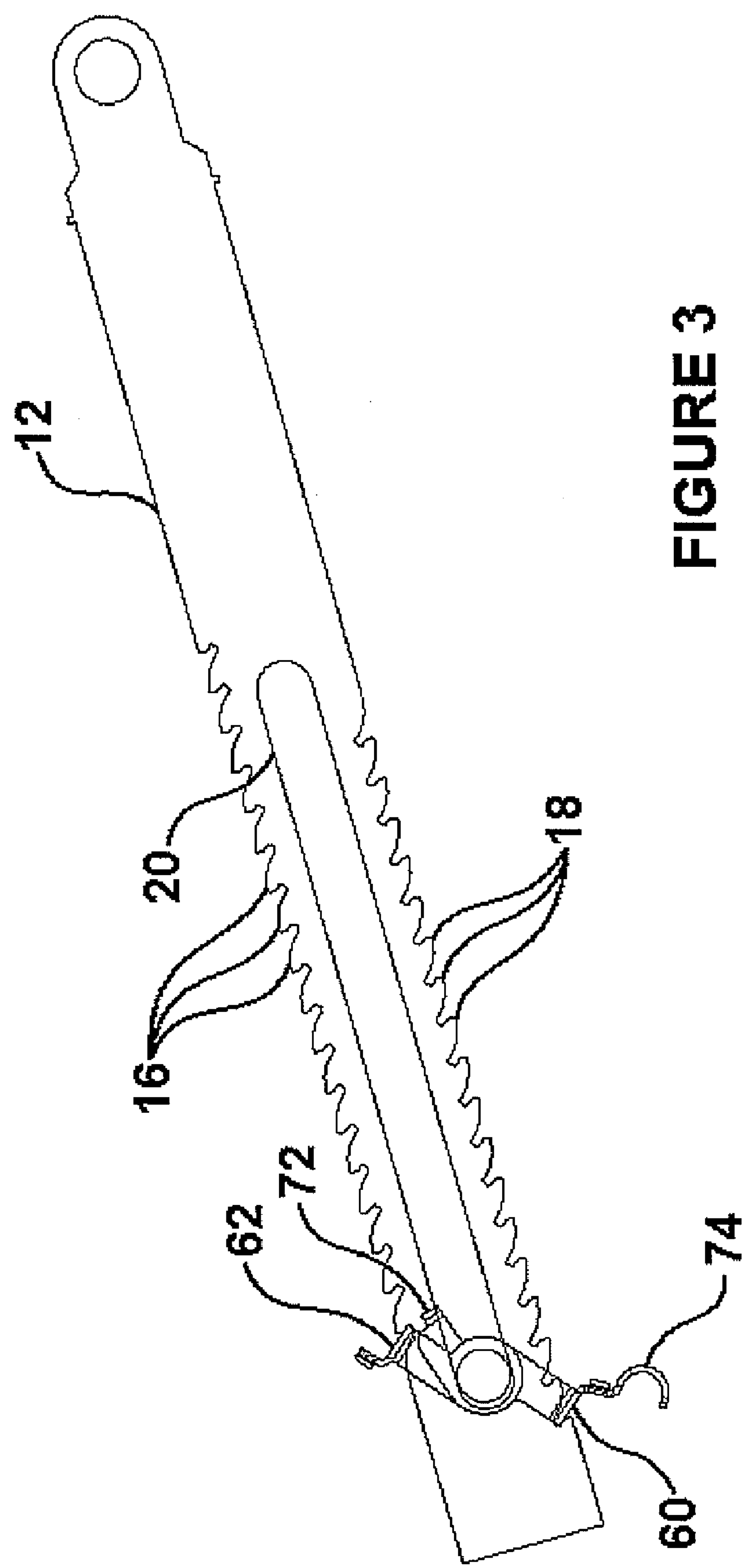
FIG. 3 is an enlarged and rotated sectional view of the gear rack and associated upper and lower locks represented in FIG. 1 and for providing bi-directional adjustment of the seatback relative to an upper rear package shelf location of the vehicle frame.
Figure 4:
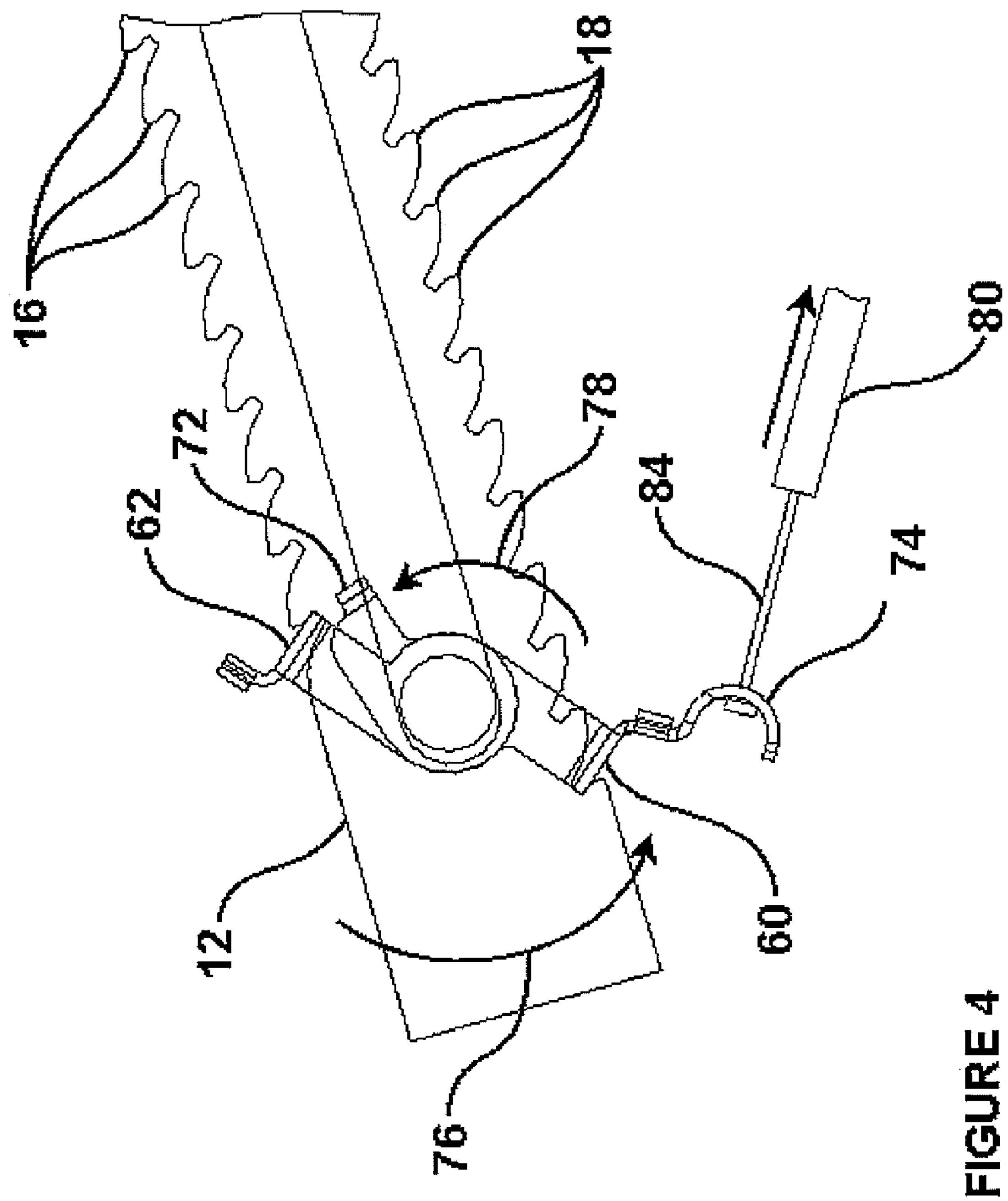
FIG. 4 is an enlarged partial view of the teethed engagement established between the upper and lower locks and the gear rack shown in FIG. 3.

A pair of locking members, generally referenced at 56 and 58 in FIG. 2, are provided and each includes a tooth engaging portion, at 60 for first locking member 56 and further at 62 for locking member 58 (see also FIG. 3 and enlarged partial view of FIG. 4). Each of the locking members 56 and 58 further exhibits a pair of legs (see in FIG. 2 at 64 and 66 for locking member 56 and further at 68 and 70 for locking member 58) extending from spaced apart locations of the respective tooth engaging portions 60 and 62. As further shown, the legs 64 & 66 and 68 & 70 each further exhibit an integrally designed coaxial (aperture) support and through which, upon assembly of the locking members 56 and 58, seats the pin 42 and in order to pivotally mounted the locking members within the sides 24 and 26 of the bracket housing.

As is further evident from FIGS. 1 and 2, the spaced apart pairs of coaxial supports are arranged in overlapping fashion, such as shown with the supports associated with the first locking member 56 being arranged in inwardly spaced fashion relative to the pair of coaxial supports associated with the second selected locking member 58. Other features include a tab 72 (FIG. 2) extending from an associated leg 64 of the first locking member 56 and which, upon actuating a further trigger portion 74 associated with a first locking member, causes the tab 72 to engage an overlapping leg 68 associated with the second locking member 58, with the result being that both of the locking members 56 and 58 are caused pivot out of contact with the gear rack 20 in the manner referenced by clockwise directional arrow 76 and 78 (again FIG. 4), this in order to permit readjustment of the seatback 4 as will be further described.

A cable includes an outer stationary portion 80 secured to a fixing location 82 (FIG. 2) associated with the housing. An inner translating portion 84 of the cable extends from the outer fixed sleeve portion 80 and engages the trigger 74 (see in particular FIG. 4). The cable extends at an opposite end to a remote located lever (not shown) and which is manipulated in order to actuate the locking members (and their associated teeth 60 and 62) to the unseating position and to permit linear displacement therebetween by the gear rack 12.

A pair of torsion springs 86 and 88 are provided and each are supported upon an opposing inner side surface of the bracket housing sides 24 and 26, this via spacer bushings 90 and 92 positionally supporting a central looped portion of each torsion spring in alignment with the aligning and overlapping coaxial supports 64 & 66 and 68 & 70. First angled ends 94 and 96 of the torsion springs 86 and 88 are secured to support holes defined in the side extending faces 24 and 26 of the housing (see selected support hole 98 in housing side 24 in FIG. 1) this in order to influence opposites spring ends 100 and 102 against the locking members 56 and 58 in first teeth engaging and biased directions (this opposite the clockwise direction shown in the rotated view of FIG. 4). A hollow spacer collar 104 (see again FIG. 2) is supported between an inner most pair of coaxial supports 64 and 66, through which the pin 42 extends, and in order to provide lateral structural stability.

The gear rack 20 is biased in a direction away from the bracket 14 via a coil spring 106 supported around the gear rack 20 in extending fashion between a cylindrical shaped shield 108 which is secured over the forward face 22 of the three dimensional housing at a first end. A linearly displaceable return stop 110 exhibits a generally disk shaped component with a central receiving aperture 112 for seating the gear rack 20 and outer angled retaining tabs 114 for biasing against a forward extending end of the coil spring 106.

In use, the locking members 56 and 58 are pivotally secured to the bracket and are biased in first directions to engage selected teeth 16 and 18 associated with the opposite extending and ratchet defining surfaces of the gear rack 20. Upon actuating the trigger portion 74 in the manner described in FIG. 4, the locking members are concurrently pivoted, in a counter biasing direction against the force of the torsion springs 86 and 88, and out of contact with the gear rack in the direction shown by rotational arrows 76 and 78. The occupant of the seat can then lean rearwardly against the seatback 4, against the biasing force of the coil spring 106, and in order to permit linear readjustment of the gear rack in a second counter-biasing direction relative (i.e. towards) the bracket subassembly 14, following which the cable is relaxed and the torsional springs reseat the locking members in re-engaging fashion with additional selected teeth associated with each of the upper and lower ratchet defining surfaces.

Additional variants contemplate, without limitation, use of a single locking member and associated ratchet defined surface, as well as redesigning the coil spring to exert a reverse biasing force on the gear rack. Having described our invention, other and additional preferred embodiments will become apparent to those skilled in the art to which it pertains and without deviating from the scope of the appended claims.

We claim:

1. A linear latch interconnecting a pivotally adjustable seatback with a frame location of a vehicle interior, said latch comprising:

a bracket securing to a surface of the frame location;

an elongated gear rack exhibiting first and second teethed and ratchet defining surfaces and supported in linearly displaceable fashion to said bracket, a forward extending end of said gear rack connecting to the seatback;

said gear rack being biased in a first lineal direction relative to said bracket; and a pair of locking members pivotally secured to said bracket and biased in first directions to engage selected teeth associated with said ratchet defining surfaces;

said locking members being concurrently pivoted out of contact with said ratchet defining surfaces to permit linear readjustment of said gear rack in a second counter-biasing direction relative said bracket, following which said locking members re-engage additional selected teeth associated with said upper and lower ratchet defining surfaces.

2. The invention as described in claim 1, said bracket further comprising:

a housing including a forward facing and centrally disposed face and a pair of side extending faces, an aperture in said forward face permitting said gear rack to displace therethrough; and a pair of angled tabs pivotally supporting said housing at first ends and fixedly mounting to the frame at second angled ends.

3. The invention as described in claim 2, further comprising a pin extending through apertures defined in said first ends of said tabs and aligning apertures defined in said side faces of said housing.

4. The invention as described in claim 3, each of said locking members further comprising a tooth engaging portion from which extends at least one leg within which is defined a coaxial support a spaced distance from said engaging portion and through which is seated said pin.

5. The invention as described in claim 4, further comprising a pair of coaxial supports associated with a first selected locking member arranged in overlapping fashion relative to a pair of coaxial supports associated with a second selected locking member.

6. The invention as described in claim 4, further comprising a tab extending from at least one leg of a first locking member and which, upon actuating a trigger portion of said first locking member, causing said tab to engage a leg associated with said second locking member and both of said locking members to pivot out of contact with said gear rack.

7. The invention as described in claim 4, further comprising at least one torsion spring secured to at least one of said side extending faces of said housing to influence said locking members in said first biased directions.

8. The invention as described in claim 5, further comprising a hollow spacer collar supported between an inner most pair of coaxial supports.

9. The invention as described in claim 7, said at least one torsion spring further comprising first and second torsion springs each supported upon an opposing inner surface of said housing via a spacer bushing positionally supporting a looped portion of each torsion springs in alignment with said coaxial supports.

10. The invention as described in claim 3, further comprising an elongated slot extending along a lineal interior of said gear rack and through which said pin seats.

11. The invention as described in claim 6, further comprising a cable including an outer stationary portion secured to a location associated with said housing, an inner translating portion extending from said outer portion and engaging said trigger.

12. The invention as described in claim 2, further comprising a coil spring supported around said gear rack in extending fashion between a cylindrical shaped shield secured over said forward face of said housing at a first end and a linearly displaceable return stop biased against said forward extending end.

13. The invention as described in claim 1, further comprising a plurality of teeth associated with said first ratchet defining surface facing in a direction opposite a further plurality of teeth associated with said second ratchet defining surface.

14. A linear latch interconnecting a pivotally adjustable seatback with a frame location of a vehicle interior, said latch comprising:

a bracket securing to a surface of the frame location and including a three dimensional and interiorly open housing and a pair of angled tabs pivotally supporting said housing at first ends and fixedly mounted to the frame at second angled ends;

a pin extending through apertures defined in said first ends of said tabs and aligning apertures defined in spaced apart sides of said housing;

an elongated gear rack exhibiting first and second teethed and ratchet defining surfaces and an elongated slot extending along a lineal interior and through which said pin seats in order to support said gear rack in linearly displaceable fashion relative to said bracket, a forward extending end of said gear rack connecting to the seatback at a location above an associated pivot axis;

a coil spring supported around said gear rack in extending fashion between a cylindrical shaped shield secured over a forward face of said housing at a first end and a linearly displaceable return stop biased against said forward extending end for biasing said gear rack in a first lineal direction relative to said bracket; and a pair of locking members each having a tooth engaging portion from which extends at least one leg within which is defined a coaxial support a spaced distance from said engaging portion and through which is seated said pin for pivotally secured said locking members within said housing and in biased fashion to engage selected teeth associated with said ratchet defining surfaces;

said locking members being concurrently pivoted out of contact with said ratchet defining surfaces to permit linear readjustment of said gear rack in a second counter-biasing direction relative said bracket, following which said locking members re-engage additional selected teeth associated with said upper and lower ratchet defining surfaces.

15. The invention as described in claim 14, further comprising a tab extending from at least one leg of a first locking member and which, upon actuating a trigger portion of said first locking member, causing said tab to engage a leg associated with said second locking member and both of said locking members to pivot out of contact with said gear rack.

16. The invention as described in claim 14, further comprising first and second torsion springs each supported upon an opposing inner surface of said housing via a spacer bushing positionally supporting a looped portion of each torsion springs in alignment with said coaxial supports for biasing said locking members in an engaging direction against said gear rack.

17. The invention as described in claim 15, further comprising a cable including an outer stationary portion secured to a location associated with said housing, an inner translating portion extending from said outer portion and engaging said trigger.

18. The invention as described in claim 14, further comprising a plurality of teeth associated with said first ratchet defining surface facing in a direction opposite a further plurality of teeth associated with said second ratchet defining surface.

19. A linear latch for use with a pivotally adjustable seatback relative a frame location of a vehicle interior, said latch comprising:

a bracket securing to a surface of the frame location;

an elongated gear rack exhibiting at least one teethed and ratchet defining surface and which is supported in lineally displaceable fashion relative to and through said bracket and frame, a forward extending end of said gear rack pivotally connecting to the seatback;

a spring supported about said gear rack and biasing said gear rack in a first lineal direction away from said bracket; and at least one locking member pivotally secured to said bracket and biased in first directions to engage selected teeth associated with said ratchet defining surface, a tab extending from a leg of said locking member and, upon actuating a trigger portion of said locking member, causing said tab to pivot out of contact with said gear rack to permit linear readjustment of said gear rack in a second counter-biasing direction relative said bracket, following which said locking member re-engages further selected teeth associated with said ratchet defining surface.

20. The invention as described in claim 19, said bracket further comprising:

a housing including a forward facing and centrally disposed face and a pair of side extending faces, an aperture in said forward face permitting said gear rack to displace therethrough; and a pair of angled tabs pivotally supporting said housing at first ends and fixedly mounting to the frame at second angled ends.

* * * * *